United States Patent [19]
Johnson

[11] 4,106,534
[45] Aug. 15, 1978

[54] APPARATUS FOR PLACING COMESTIBLES IN DISPENSING MECHANISM

[75] Inventor: Marshall B. Johnson, Chillicothe, Ohio

[73] Assignee: Wear-Ever Aluminum, Inc., Chillicothe, Ohio

[21] Appl. No.: 695,464

[22] Filed: Jun. 14, 1976

[51] Int. Cl.² .............................................. B65B 3/10
[52] U.S. Cl. ........................................ 141/18; 141/85; 141/98; 417/489
[58] Field of Search ................. 99/428; 141/1, 11, 12, 141/18, 27, 71, 98, 85, 89; 222/325, 386, 388; 417/489

[56] References Cited
U.S. PATENT DOCUMENTS

| 857,814 | 6/1907 | Lippincott | 417/489 X |
| 1,165,083 | 12/1915 | Fisher | 222/388 |
| 1,165,883 | 12/1915 | Kremer | 222/388 |

Primary Examiner—Richard E. Aegerter
Assistant Examiner—Frederick R. Schmidt
Attorney, Agent, or Firm—Patrick J. Viccaro

[57] ABSTRACT

A barrel filler is provided for facilitating, filling and compacting of comestibles, such as cookie dough or the like in a dispensing mechanism for extruding the comestibles. The barrel filler is designed for placing comestibles in a dispensing mechanism having a centrally located shaft with a piston thereon. The barrel filler is designed to permit sanitary cleaning thereof.

4 Claims, 3 Drawing Figures

APPARATUS FOR PLACING COMESTIBLES IN DISPENSING MECHANISM

BACKGROUND OF THE INVENTION

This invention relates to an apparatus for placing of comestibles in a dispensing or extruding mechanism. More particularly, this invention relates to a barrel filling device for a hand-held electrified piston-type dispenser for viscous or pasty comestibles.

In the dispensing or extruding of comestibles such as cookie dough, icing or the like, it is desirable to have an apparatus that facilitates placing or filling of the comestible into the dispensing mechanism. One such dispensing mechanism utilizes a removable piston slidably and nonrotatably arranged in a barrel and urged to travel in the barrel by a rotatable piston rod externally threaded through a threaded hole in the piston. Such a mechanism is described and claimed in United States patent application Ser. No. 645,239, filed Dec. 29, 1975, now U.S. Pat. No. 3,984,033 and assigned to the assignee of this invention. Other dispensing mechanisms having a centrally located shaft in the barrel are also available. The user of such mechanisms has difficulty in filling and packing the barrel with the desired amount and density of comestibles due to the centrally located shaft. Such dispensing mechanisms thus present a problem in that it is desirable to have an apparatus that can efficiently be used to fill the dispensing mechanism with the desired amount of comestibles.

There exists a need, therefore, for an uncomplicated device, particularly suited for use with centrally shafted dispensing mechanisms, for placing comestibles in a dispensing mechanism easily and efficiently by an ordinary person without any particular mechanical skill, while permitting sanitary cleaning of the filler device.

SUMMARY OF THE INVENTION

In accordance with the present invention, comestibles are placed in a dispensing mechanism by a filler device that is easily used and designed to facilitate sanitary cleaning. Generally stated, the invention contemplates a tubular body, a base portion on one end of the tubular body configured to fit within the barrel of a dispensing mechanism, a longitudinal opening in the tubular body to facilitate cleaning of the filler device, and a hole in the base portion adapted to permit a centrally located shaft of the dispensing mechanism to pass therethrough. The barrel filler slidably engages within the barrel of a dispensing mechanism for placing and packing comestibles within the barrel. More particularly, it is suitable for use with a centrally shafted dispensing mechanism having a rotating shaft and a non-rotating piston thereon, where the shaft passes through the hole in the base portion of the barrel filler and slides in the tubular portion of the barrel filler as the barrel filler places and packs the comestible within the barrel.

DETAILED DESCRIPTION OF THE PREFERRED EMBODIMENTS OF THE INVENTION

Figure 1:
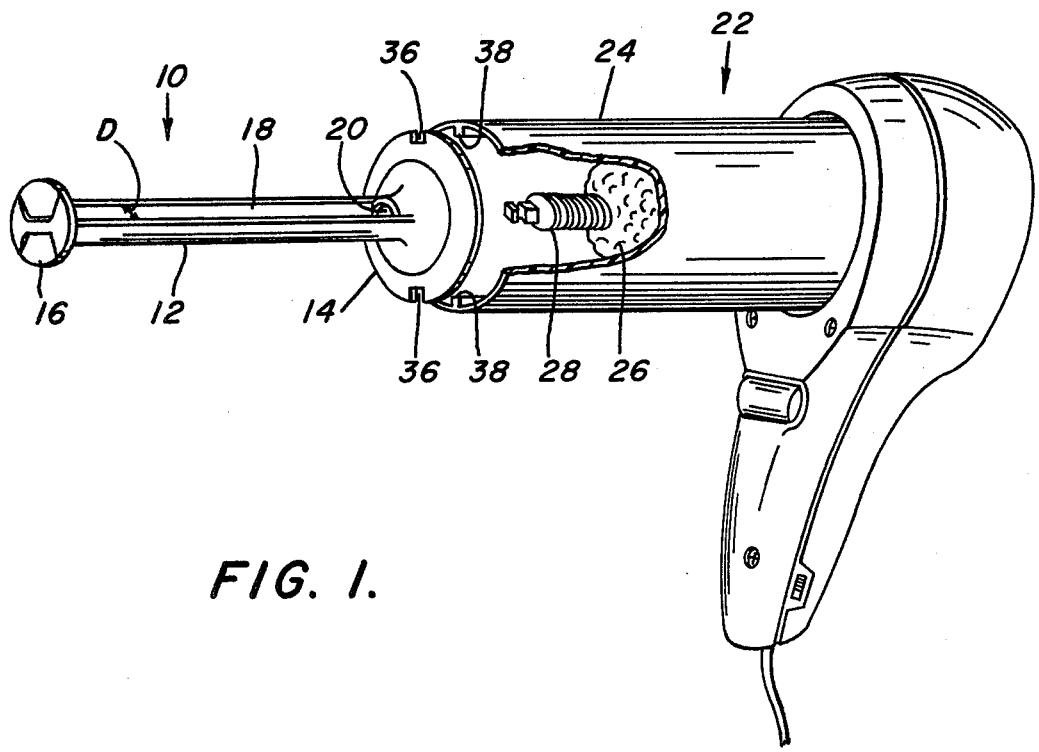
FIG. 1 is a partially cut away perspective view illustrating a preferred embodiment of the present invention in actual use.

FIG. 1 illustrates a perspective view of a preferred embodiment of the barrel filler apparatus 10 of the present invention as it would be used with a dispensing mechanism 22. The filler apparatus 10 includes an elongated body portion 12, a base portion 14 having a hole 20 therethrough substantially aligned with a longitudinal opening or groove 18 in elongated body portion 12. A head portion 16 is located at the other end of elongated body portion 12. The filler apparatus 10 is configured to closely fit within a barrel 24 of dispensing apparatus 22 in order to force and pack comestibles 26 within barrel 24 while permitting piston rod 28 to pass through hole 20 of base portion 14 of apparatus 10.

Figure 2:
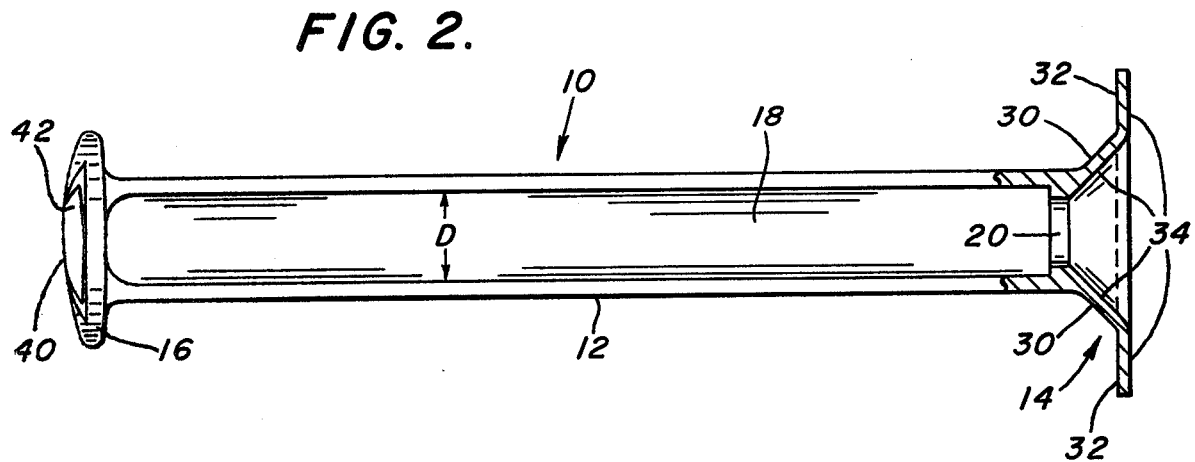
FIG. 2 is a partial cross section of a preferred embodiment of the invention.

Base portion 14 is shown configured as a circular disc having a hole 20 therethrough, preferably at the geometric center of base 14. The size and shape of the base 14 is such as to conform to the cross section of barrel 24 and be in a close tolerance fit with the interior surface of barrel 24 of dispensing mechanism 22. As shown in FIG. 2, the preferred embodiment of base 14 includes a first flange portion 30 divergingly extending from the hole and a second flange portion 32 turned on an angle from the first flange portion 30 such it lies in a plane substantially perpendicular to the longitudinal axis of the tubular body 12. Surfaces 34 of the base portion 14 are for primarily contacting with the comestibles when filling barrel 24. Hole 20 is substantially concentric with tubular body 12 and longitudinal opening 18 in order to permit a piston rod or shaft 28 (shown in FIG. 1) of dispensing mechanism 22 to pass through hole 20 and enter the tubular body 12.

The elongated body portion 12 may be of any convenient shape and has a longitudinal opening 18 therein which also facilitates cleaning. Preferably, elongated body portion 12 is tubular with longitudinal opening 18 extending the length of the tubular body portion 12. A purpose and distinct advantage of having longitudinal opening 18 in tubular body 12 is to prevent comestibles from packing within he tubular body 12 during an operation of filling dispensing mechanism 22. The width D of the longitudinal opening 18 in tubular body 12 may vary but it should be of sufficient width to facilitate cleaning of the filler apparatus 10. Similarly, the interior configuration of longitudinal opening 18 should be relatively free of angles that would make cleaning difficult. A generally curvilinear interior shape further facilitates cleaning of the apparatus 10.

FIG. 1 further shows a pair of diametrically opposed notches 36 on base portion 14 for sliding cooperation with ribs 38 within barrel 24 of dispensing mechanism 22. Such notches 36 are provided to insure a close fit tolerance within barrel 24 for efficiently contacting and pushing comestibles 26 within barrel 24 during filling operations. While the preferred embodiment illustrated and described herein includes a circular shape disc for base portion 14 having notches 36 thereon, it should be understood that base portion 14 could have various shapes and be without notches 36 and other noncircular means. It is sufficient that base portion 14 include some means for cooperating with the interior surfaces of barrel 24 of the dispensing mechanism 22.

Figure 3:
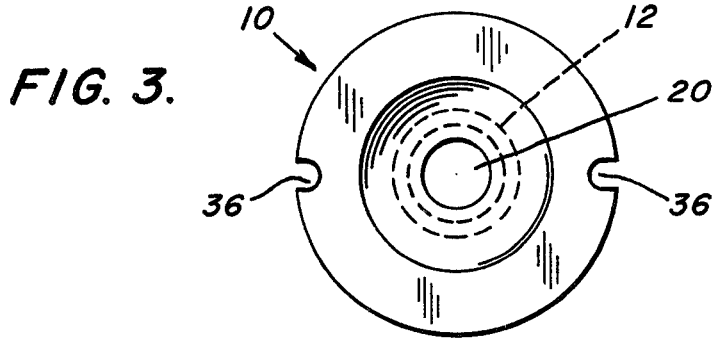
FIG. 3 is an end view of the base portion of the filler apparatus of FIG. 2.

Base portion 14 is further shown in FIG. 3 which illustrates an end view of base 14 of the filler apparatus 10 in a preferred embodiment of the present invention.

Base portion 14 is shown configured with a pair of diametrically opposed notches 36 and a hole 20 concentric with tubular body 12.

FIG. 1 further illustrates head portion 16 at the other end of tubular body 12. Head 16 can have any convenient shape and usually is smaller in dimension than base portion 14 to facilitate easier use of the filler apparatus 10 when it is almost fully extended into barrel 24 of dispensing mechanism 22. Preferably, head 16 will include a gripping means 40 to further aid one in using the filler apparatus 10. Such gripping means 40 may take various shapes and may include a raised portion 42 as illustrated in FIG. 2.

Apparatus 10 can be made of various material compositions. Consistent with an objective of the invention to provide a sanitary apparatus that is easily cleaned, the apparatus 10 preferably comprises an integral plastic material capable of withstanding temperatures normally encountered in dishwashing equipment in the home. Most preferably, apparatus 10 is composed of a translucent or transparent sanitary thermoplastic such as a polypropylene material.

The use and operation of the barrel filler apparatus can be more completely shown by FIG. 1. Comestibles 26 or other viscous material are placed in the open end of barrel 24 of dispensing mechanism 22 by the user in any convenient way. Barrel filler apparatus 10 is then positioned, base portion 14 first, into the open end of barrel 24. Slight inward pressure exerted by the user on barrel filler apparatus 10 contacts surfaces 34 with comestibles 26 and forces comestibles 26 toward the closed end of the barrel more compactly. Apparatus 10 is capable of extruding far into the barrel 24 as piston rod 28 passes through hole 20 in base portion 14 and moves within longitudinal opening 18 in tubular body 12. Filler apparatus 10 is then removed from barrel 24 and more comestibles are placed into the open end of barrel 24. Apparatus 10 is then again inserted into the barrel 24 to compact the comestibles. This procedure is repeated until barrel 24 contains the desired amount of comestibles.

During the operation of filling barrel 24 of dispensing apparatus 22, some amount of comestibles may enter hole 20 in base portion 14 and be pushed into the tubular body 12 by the end of piston rod 28 of the dispensing apparatus 22. Longitudinal opening 18 of tubular body 12 prevents the comestibles from compacting in the tubular body 12 at end 16. Such compacting would not permit the filler apparatus to function properly. Longitudinal opening 18, however, allows comestibles to ooze or extrude out of the tubular body 12 during the filling operation and to be easily and sanitarily cleaned therefrom after the filler apparatus 10 is removed from the dispensing mechanism 22. Furthermore, the close fit tolerance of base portion 14 within the interior surfaces of barrel 24 provides an even and uniform compaction of comestibles within the barrel and little, if any, extruding of the comestibles between the periphery of base portion 14 and the interior surfaces of barrel 24.

As is an objective of the invention, the barrel filler apparatus thus provides an efficient, easy to use and sanitary apparatus for placing comestibles in dispensing mechanisms. The close fit tolerance of base portion 14 within the interior surfaces of barrel 24 also enables filler apparatus 10 to be used to scrape and remove any unused comestibles from the inside of barrel 24 during the cleaning of the dispensing apparatus 22.

Although a preferred embodiment and alternative embodiments have been illustrated and described, it will be apparent to those skilled in the art that minor changes can be made therein without departing from the scope of the invention.

Having thus described the invention, what is claimed is:

1. An apparatus in combination with a dispensing mechansim, the apparatus for placing comestibles in a barrel of a said dispensing mechanism, said dispensing mechanism, having a shaft located at the longitudinal axis of the barrel, the apparatus comprising:
   (a) a substantially tubular body portion;
   (b) an integral base portion at one end of said body portion, said base portion having a hole therethrough substantially aligned with the longitudinal axis of said body portion, the hole being larger than the shaft for receiving therethrough the end of the shaft of the dispensing mechanism into said tubular body and the outer configuration of said base portion being substantially identical to the noncircular cross section of the barrel of the dispensing mechanism;
   (c) an integral head portion at the other end of said body portion, said head including a means for gripping; and
   (d) means on said tubular body for permitting access to within said tubular body for cleaning includes a longitudinal opening extending along the length of said tubular body.

2. An apparatus as set forth in claim 1 wherein said base portion further comprises:
   (a) a first flange portion divergingly extending from the hole in said base portion; and
   (b) integral therewith, a second flange portion inclined in a plane substantially perpendicular to the longitudinal axis of said base portion.

3. An apparatus as set forth in claim 2 wherein said second flange portion of said base portion further includes a means for cooperating with the interior surfaces of the barrel of the dispensing mechanism.

4. An apparatus in combination with a dispensing mechanism, the apparatus for placing comestibles in a barrel of said dispensing, said dispensing mechanism having a rotating shaft located at the longitudinal axis of the barrel, said shaft having a non-rotating piston thereon with a notch on the peripheral surface of the piston for cooperation with a longitudinal rib in the barrel, the apparatus comprising:
   (a) a substantially tubular body portion adapted to receive therein said dispensing mechanism shaft, said body portion having a longitudinally extending opening therein extending the length thereof to facilitate cleaning;
   (b) an integral base portion at one end of said body portion, said base portion having a hole therethrough substantially concentric with said tubular body, the hole substantially aligned with the longitudinal opening and being larger than the shaft to receive therethrough the end of said shaft into the tubular body, a first flange portion divergingly extending from the hole, and integral with said first flange portion, a second flange portion inclined in a plane substantially perpendicular to the longitudinal axis of said body portion, the outer configuration of said base portion being substantially identical to the noncircular cross section of the barrel;
   (c) said base portion having at least one notch on the peripheral surface to cooperate with at least one longitudinal rib in said barrel; and
   (d) an integral head portion at the other end of said body portion, said head including a means for gripping.

* * * * *

UNITED STATES PATENT AND TRADEMARK OFFICE
CERTIFICATE OF CORRECTION

PATENT NO. : 4,106,534

DATED : August 15, 1978

INVENTOR(S) : Marshall B. Johnson

It is certified that error appears in the above-identified patent and that said Letters Patent are hereby corrected as shown below:

| | |
|---|---|
| Col. 2, line 27 | After "such" insert --that-- |
| Col. 2, line 62 | After "be" insert --with or-- |
| Col. 3, line 32 | Change "extruding" to --extending-- |
| Col. 4, line 39, Claim 4 | After "dispensing" (first occurrence) insert --mechanism-- |

Signed and Sealed this

Sixth Day of February 1979

[SEAL]

Attest:

RUTH C. MASON
Attesting Officer

DONALD W. BANNER
Commissioner of Patents and Trademarks